(12) United States Patent
Miller et al.

(10) Patent No.: US 7,161,960 B2
(45) Date of Patent: Jan. 9, 2007

(54) APPARATUS, AND ASSOCIATED METHOD, FOR FORMING, AND OPERATING UPON, MULTIPLE-CHECKSUM-PROTECTED DATA PACKET

(75) Inventors: Keith Miller, Plano, TX (US); Marta Karzewicz, Irving, TX (US)

(73) Assignee: Nokia Corporation, Espoo (FI)

( * ) Notice: Subject to any disclaimer, the term of this patent is extended or adjusted under 35 U.S.C. 154(b) by 1018 days.

(21) Appl. No.: 10/106,468

(22) Filed: Mar. 26, 2002

(65) Prior Publication Data

US 2003/0185239 A1 Oct. 2, 2003

(51) Int. Cl.
*H04J 3/24* (2006.01)

(52) U.S. Cl. ........................................ 370/474; 370/476

(58) Field of Classification Search ................ 370/349, 370/350, 352, 389, 392, 465, 466, 467, 469, 370/470, 471, 472, 473, 474, 476

See application file for complete search history.

(56) References Cited

U.S. PATENT DOCUMENTS

| | | | |
|---|---|---|---|
| 6,289,023 B1 * | 9/2001 | Dowling et al. ............ 370/419 |
| 6,732,329 B1 * | 5/2004 | Bace ........................... 714/807 |
| 6,820,233 B1 * | 11/2004 | Johansson et al. ........... 714/808 |
| 6,954,893 B1 * | 10/2005 | Ternullo et al. ............. 714/807 |
| 2001/0036196 A1 * | 11/2001 | Blightman et al. .......... 370/465 |
| 2002/0059465 A1 * | 5/2002 | Kim ........................... 709/248 |
| 2003/0035441 A1 * | 2/2003 | Cheng et al. ................ 370/474 |
| 2004/0264434 A1 * | 12/2004 | Weissberger et al. ........ 370/350 |

* cited by examiner

*Primary Examiner*—Phirin Sam
(74) *Attorney, Agent, or Firm*—Foley and Lardner LLP

(57) ABSTRACT

Apparatus, and an associated method, for forming a UDP-Lite, or other, data packet with multiple, dynamically-selected, checksum-protected parts. Digitized data is provided to a formatter, and the formatter forms the data packet to include header fields identifying parts of the payload portion of the data packet that are checksum-protected with different checksums. Additional indicia is contained in the header part of the data packet to identify the checksum-type and the checksum-values associated with the separate parts of the data packet. Multiple, contiguous parts of the data packet are checksum-protected with selectable checksum-types, selected by a selector that operates to control operation of the formatter.

20 Claims, 4 Drawing Sheets

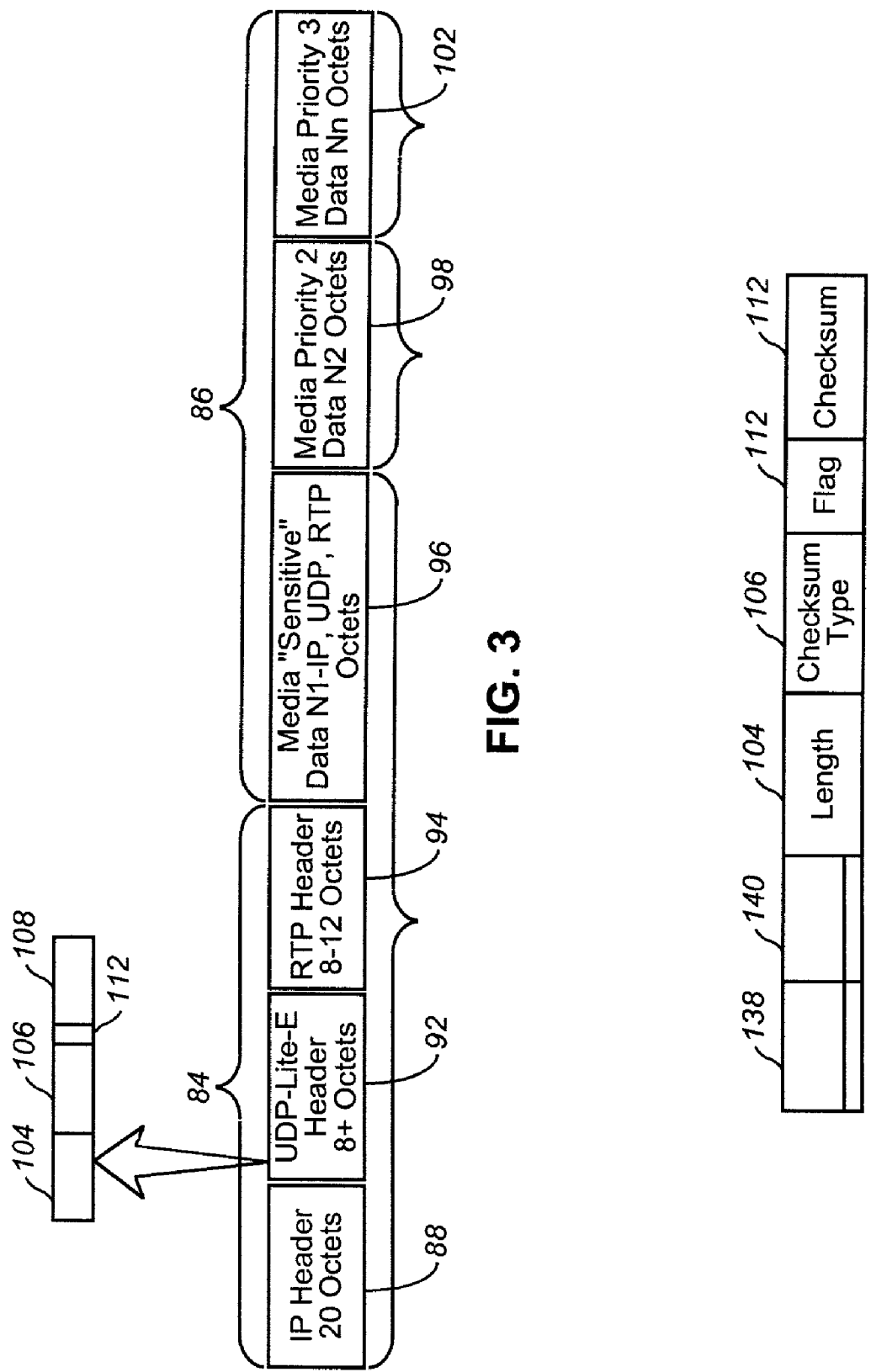

APPARATUS, AND ASSOCIATED METHOD, FOR FORMING, AND OPERATING UPON, MULTIPLE-CHECKSUM-PROTECTED DATA PACKET

The present invention relates generally to a manner by which selectively to provide extended checksum protection to a data packet communicated between communication stations of a communication system. More particularly, the present invention relates to apparatus, and an associated method, by which to form a modified UDP-Lite or other packet-formatted data packet, having multiple, dynamically-selected, checksum-protected parts. Multiple, contiguous parts of the data packet are checksum-protected with selectable checksum-types. Upon transmission, and delivery, of the data packet, checksum calculations are performed upon the separate parts of the data packet. Increased flexibility of checksum protection is provided to permit any part of the data packet to be covered by any selected checksum-type coverage. And, separate parts of a single data packet can be protected by separate, and different, checksums.

BACKGROUND OF THE INVENTION

New types of communication systems, as well as improvements to existing communication systems, have been permitted as a result of advancements in communication technologies. Such new communication systems, or existing communication systems that include improvements, generally permit larger amounts of, and additional types of, data to be communicated at increased throughput rates. New communication services, requiring, e.g., high data throughput rates are possible through the use of such new and improved communication systems.

Advancements in digital communication techniques, for instance, are amongst the advancements in communication technologies that have permitted new communication systems and improvements to existing communication systems. When digital communication techniques are used, data that is to be communicated is digitized. And, the digitized data, so-formed, is formatted in a selected manner, prior to communication thereof. The digital data is formatted, typically into packetized form. The packetized, digital data is referred to as packet data, formed of data packets. Individual ones of the data packets can be communicated at discrete intervals to effectuate communication of the data pursuant to a communication service.

Various protocol schemes have been promulgated by which to standardize the formatting of the digitized data into data packets. And, more than one formatting protocol is sometimes used in the formation of a single data packet. That is to say, multiple-levels, or layers, of formatting of the digitized data are sometimes provided.

A communication device used to communicate data, either to send the data or to receive the data, can be represented in logical-layer form. Such representation, as appropriate, includes layers at which formatting is applied to, or removed from, digitized data. A user datagram protocol (UDP), or UDP protocol, is an exemplary protocol scheme that is widely utilized. UDP formatted data is regularly communicated, for instance, in the effectuation of real-time communication services. Conventional UDP-formatting of data advantageously provides for sending-station-specified data rates. And, data packets delivered to a receiving station are delivered immediately to a receiving application irrespective of their order of arrival. In conventional UDP formatting, a checksum is used to verify UDP header and payload data parts, thereby to effectuate validation of received data packets. Conventional UDP checksum protection provides protection for an entire payload portion of a UDP-formatted data packet or for none of the payload portion of the data packet.

With the advent of packet radio communication systems in which an air interface is defined upon which to communicate packetized data between sending and receiving stations, a modified UDP formatting scheme, referred to as UDP-Lite, is sometimes used. The UDP-Lite scheme is compatible with the conventional UDP formatting scheme and is intended further to provide improved functionality and flexibility needed for communications in a radio environment.

A UDP-Lite-formatted data packet differs with a conventional, UDP-formatted packet in that the UDP length and checksum is replaced with a partial coverage length and partial checksum. Thereby, the data contained in the UDP-Lite data packet is separated into protected and unprotected sections. Pursuant to checksum calculations, when an error is detected in the protected part, the data packet is discarded. However, errors contained in the unprotected part of the data packet do not cause the data packet to be discarded, and, instead, the data packet is provided to an application layer of the receiving station at which the data packet is received.

Passing of data to an application layer irrespective of whether the data contains errors is generally advantageous in real-time applications, such as audio, video, or image communication applications. However, there may be times in which detection of errors should be detected and not necessarily immediately passed to the application layer. For instance, a video data packet, i.e., a data packet containing information used pursuant to effectuation of a video communication service, might be formed, sequentially, of header information, macro-block information, DC coefficients, and AC coefficients. When formatted as a UDP-Lite packet, the checksum can be defined such that the header information, the macro-block information, and the DC coefficients are protected while the AC coefficients are left unprotected. If, though, the non-protected part of the data packet is corrupted during its communication to a receiving station and the application level layer is unaware of the corrupted data, processing of the corrupted data might be more problematic than discarding the data.

If a second checksum were provided for the data packet, the corrupted data would be detected and the data packet could be discarded. If a manner could be provided, therefore, by which to provide a second checksum protection to this additional portion of the UDP-Lite data packet, improved communications could be provided.

More generally, a data packet construction providing for multiple checksum protection would permit multiple portions of the data packet to be checksum protected.

It is in light of this background information related to the communication of packet-formatted data that the improvements of the present invention have evolved.

SUMMARY OF THE INVENTION

The present invention, accordingly, advantageously provides apparatus, and an associated method, by which selectively to provide extended checksum protection to a data packet constructed at a first communication station for communication to a second communication station.

Through operation of an embodiment of the present invention, a manner is provided by which to form a modified UDP-Lite, or other packet-formatted, data packet having multiple, dynamically-selected, checksum-protected parts.

A data packet constructed pursuant to an embodiment of the present invention is selectably of multiple, contiguous parts, each part of which is separately protected with a selected checksum-type. Because of the dynamically selectable nature of the checksum protection provided through operation of an embodiment of the present invention, increased flexibility of checksum protection is provided to permit thereby any part of the data packet to be covered by any selected checksum-type coverage. The separate parts of the single data packet can be protected by separate, and different, checksums.

In one aspect of the present invention, digitized data is formatted into a data packet according to an extended, UDP-Lite protocol scheme. The packet-formatted data packet formed as a result of the formatting includes a header part and a payload part. The data packet is partitioned into parts that are protected by separate checksum types. The parts into which the packet is divided can be formed of non-overlapping, as well as overlapping parts. The separate parts are selectable. Both the lengths and locations of the parts are selectable. And, if successive data packets are formatted and successively communicated, the selection of the parts, their locations, and lengths are all dynamically reselectable.

In another aspect of the present invention, the types of checksum coverage by which the separate parts of the data packet are protected are selectable. Different levels of checksum protection can thereby be selected and provided to the separate parts of the data packet. When successive data packets are formatted and successively communicated, the types of checksum protection provided to the different parts of successive ones of the data packets can be dynamically selected and reselected.

Dynamic reselection of the characteristics of the data packet is made, for instance, responsive to measurements of communication conditions upon a communication channel upon which the data packets are communicated. And, such dynamic reselection of the characteristics of the data is also, or alternately, made responsive to the type of data that is to be packet-formatted into the data packets.

In another aspect of the present invention, a controller controls formatting operations performed by a formatter to format digitized data into the packet-formatted data packets. The controller selects which parts of the data packets formed by the formatter form the separate parts protected by separate checksums as well as the types of checksums by which the separate parts are protected. Reselection of the characteristics of the data packets are made by the controller responsive to indicia provided thereto. The indicia includes, for instance, indications of communication conditions upon the communication channel and indications of the type of data that is provided to the formatter to be formatted threat. As communication conditions change or as the type of data to be formatted by the formatter changes, the characteristics of the data packet formed by the formatter correspondingly change.

In another aspect of the present invention, the data packet includes fields identifying the parts of the data packet protected by checksums. Two, or more, parts of the data packet are protected by separate checksums. The fields identifying the parts identify the parts at least by their lengths in length fields. In the exemplary implementation, the length field identifying the length of a part of the data packet encompassed by a checksum is followed by a checksum field. The checksum field identifies the type of checksum that protects the selected part of the data packet. And, in the exemplary implementation, the checksum-type field is followed by a checksum value field that identifies the value of the checksum. Thereby, the part of the data packet encompassed by a first checksum, the checksum type, and the checksum value all form portions of the data packet.

An identifier is contained in one of the length or checksum fields to indicate that subsequent fields shall identify another part of the data packet to be protected by another checksum. The identifier forms, for instance, a single-bit flag contained in the checksum-type field. When the flag, or other identifier, is set, additional fields are contained in the data packet identifying, also at least by length, checksum-type, and checksum value, the location and checksum information associated with the additional part of the data packet. When two parts of the data packet are protected by the separate checksums, the data packet contains separate length fields, separate checksum-type fields, and separate checksum value fields. When the data packet includes yet further parts protected by separate checksums, the data packet includes additional length, checksum-type, and checksum-value fields associated with these additional parts.

In another aspect of the present invention, subsequent to transporting of the data packet upon a communication channel to a receiving station, the values contained in the fields associated with the parts of the data packet protected by the checksums are extracted and used to perform checksum calculations to ensure that the protected portions of the data packet do not contain corrupted information. When the checksum-type identifies a value contained in a look-up table of the receiving station, the look-up table is accessed to retrieve the checksum-type and checksum calculations are subsequently performed. Checksum calculations are performed upon each part of the data packet protected by the checksums.

Thereby, multiple checksum protection is provided for multiple parts of a data packet. The parts of the data packet protected by the checksum are dynamically selectable as are also the checksum types by which the parts are protected.

When implemented as an extended UDP-Lite data packet, improved flexibility is provided for protection of the integrity of the data that is communicated pursuant to a communication service.

In these and other aspects, therefore, apparatus, and an associated method, is provided for a packet communication system having a first communication station for sending data formatted into a packet-formatted data packet pursuant to a selected packet formatting protocol upon a communication channel. The packet-formatted data packet has a header part and a payload part. A first selected portion of the data packet is selectably checksum-protected by a first selected checksum, and at least a second selected portion of the data packet is protected by at least a second selected checksum. A formatter is coupled to receive the data to be sent by the sending station. The formatter formats the data pursuant to the selected packet data protocol to form the packet-formatted data packet therefrom. The data packet selectably has a first part identifying the first selected portion and indicia associated with the first selected checksum. The data packet further selectably has at least a second part identifying at least the second selected portion and indicia associated with the second selected checksum. A selector is coupled to the formatter. The selector selectably selects the first part and the first selected checksum and selectably selects the second part and the at least the second checksum.

A more complete appreciation of the present invention and the scope thereof can be obtained from the accompanying drawings that are briefly summarized below, the following detailed description of the presently-preferred embodiments of the invention, and the appended claims.

BRIEF DESCRIPTION OF THE DRAWINGS

FIG. 3 illustrates the format of an exemplary data packet formed pursuant to operation of an embodiment of the present invention.

FIG. 4 illustrates a table listing the description of the header field forming a portion of the data packet shown in FIG. 3.

DETAILED DESCRIPTION

Figure 1:
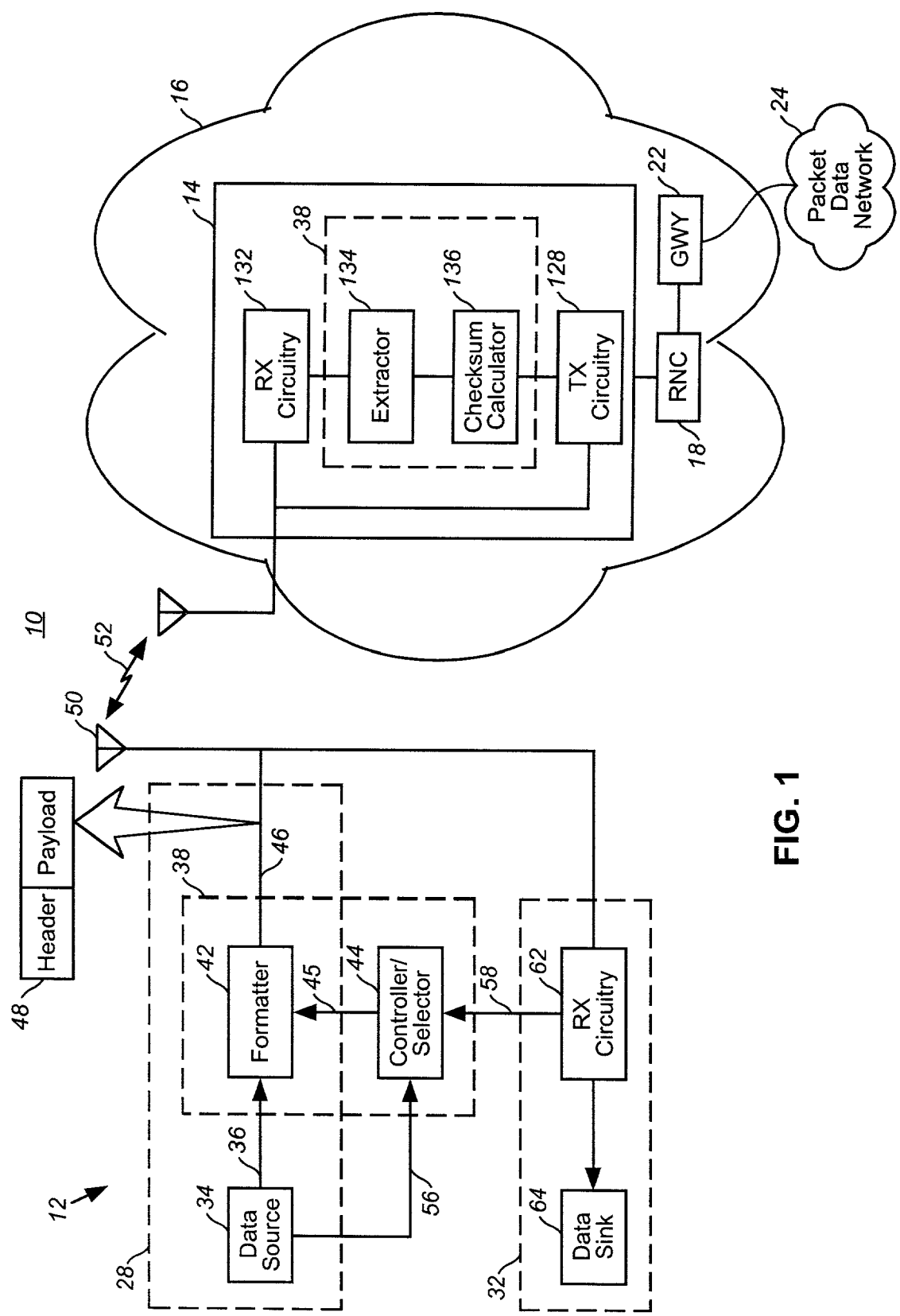
FIG. 1 illustrates a functional block diagram of a communication system in which an embodiment of the present invention is operable.

Referring first to FIG. 1, a communication system, shown generally at 10, operates to communicate packet-formatted data between communication stations of the communication systems. Here, a first communication station forms a mobile station 12, and a second communication station forms a fixed-site base transceiver station (BTS) 14 of a network part of the communication system. The base transceiver station 14 forms a portion of a radio access network (RAN) 16 that includes a radio network controller (RNC) 18 and a gateway (GWY) 22. The radio access network, in turn, is coupled to a core network 24, here a packet data network (PDN), such as the Internet backbone.

It should be noted at the outset that the communication system 10 shown in the Figure is exemplary and that operation of an embodiment of the present invention can be implemented in any of many various other communication systems. While the following description shall describe operation of an embodiment of the present invention with respect to its implementation in the radio communication system shown in FIG. 1, the apparatus and method of the present invention can be implemented in any of many other types of communication systems, both radio communication systems and wireline communication systems. And, more generally, an embodiment of the present invention is implementable in almost any type of packet-formatted communication system in which packet-formatted data is communicated during operation of the communication system.

Here, the communication station 12 forms a mobile station operable in a radio communication system and is, e.g., representative of a mobile station, or other end user unit, of a cellular communication system. The mobile station forms a radio transceiver having a transmit part 28 and a receive part 32, thereby to permit two-way communication of packet-formatted data with the base transceiver station. Data to be communicated by the mobile station to the base transceiver station is sourced at a data source 34 that, here, forms a portion of the mobile station. The data source generates digitized data bits that are generated on the line 36.

The mobile station includes the apparatus 38 of an embodiment of the present invention. The apparatus 38 is formed of functional elements that are represented by blocks in the Figure. While, in the exemplary implementation, the functions provided by the elements forming the apparatus 38 are implemented, at least in part, by algorithms executable by processing circuitry, the implementation of the elements forming the apparatus 38 can be carried out in any desired manner. The apparatus here includes a formatter 42 and a selector 44, coupled to the formatter by way of the lines 45.

The formatter 42 is coupled to the line 36 to receive the digitized data generated by the data source 34. The formatter operates to format the digitized data provided thereto according to a protocol defined by an embodiment of the present invention to produce, thereby, a packet-formatted data packet on the line 46. An exemplary data packet 48 generated on the line is represented in the Figure. Once formed, the data packet is operated upon by conventional radio circuitry (not separately shown) and provided to an antenna transducer 50 to be transduced therefrom. The data packet is communicated upon a communication channel defined upon a radio link 52 formed between the mobile station and the base transceiver station.

Formatting performed by the formatter is, at least in part, controlled by the selector 44 that also forms a portion of the apparatus 38. In the implementation shown in the Figure, the selector is operable, in part, responsive to indicia associated with the data sourced at the data source 34 and here shown to be provided to the selector by way of the line 56. And, the selector is also coupled to the receive part 32, here represented by way of the line 58 to receive indicia associated with receive data received at the mobile station and operated upon threat. Operation of the selector 44 is thereby also responsive to indicia associated with data received at the mobile station.

The receive part 32 of the mobile station is here shown to include receive circuitry 62 that is coupled to the antenna transducer 50 to receive electrical representations of receive signals received at the mobile station. And, the receive circuitry coupled to a data sink at which data received at the mobile station and operated upon by the receive circuitry is applied.

During operation of the apparatus 38, checksum protection is provided to two, or more, separate parts of a data packet formed by the formatter. The separate parts are protected by separate checksums, and the data packet includes indication of the checksum protection associated with the different parts to permit checksum calculations to be performed upon the data packet upon its delivery to a receiving station, here the base transceiver station 14. Selection of the parts of the data packet that are to be protected by the checksum, as well as the types of checksums that encompass and protect the parts of the data packet.

Figure 2:
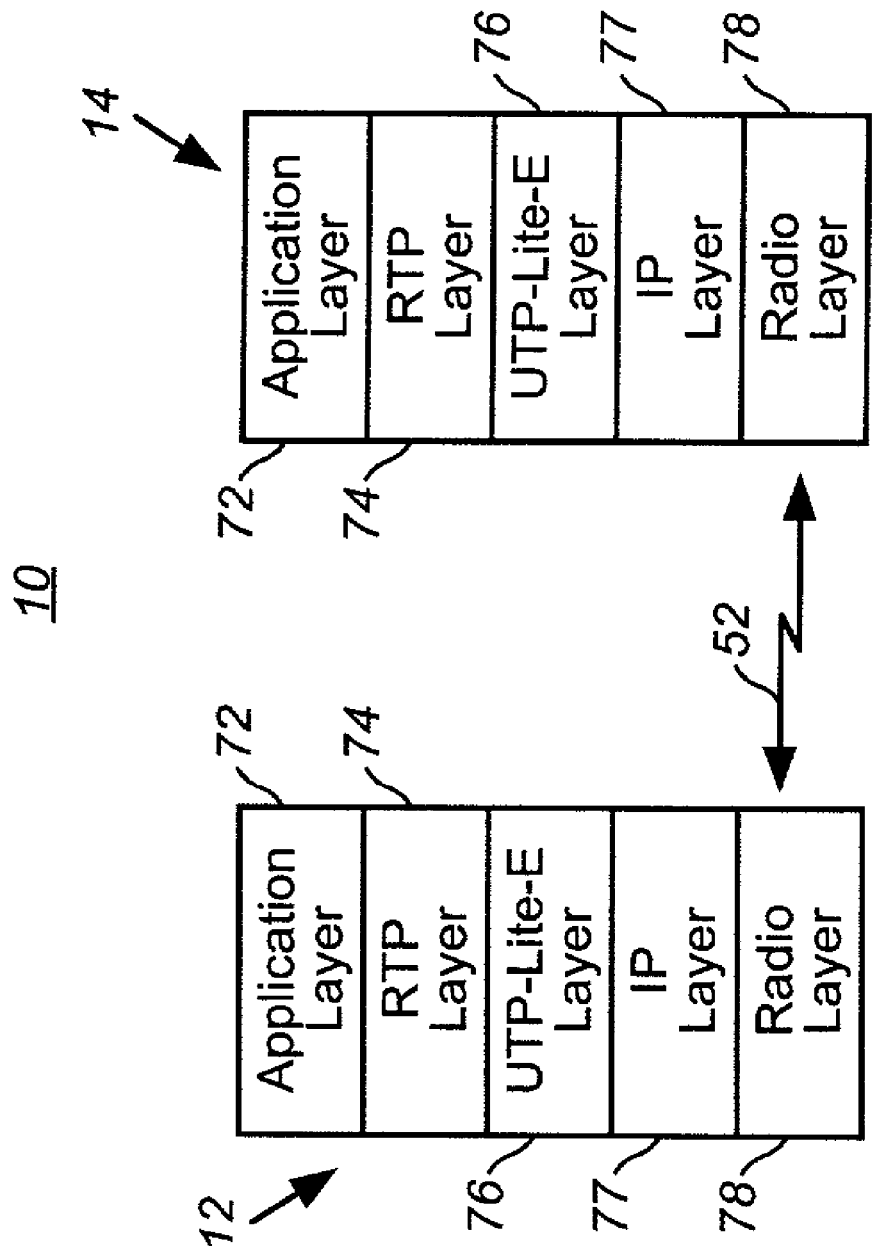
FIG. 2 illustrates a representation, in logical-layer form, of the communication system shown in FIG. 1.

FIG. 2 again illustrates the communication system 10, here in logical-layer form. Both the mobile station 12 and the base transceiver station 14 are represented in terms of logical layers. Top-most layers of both the mobile station and the base transceiver station form application layers 72. The application layers generate the data that is communicated during operation of the communication system. The application layers are positioned upon packet-formatting layers 74, 76, and 77. Here, specifically, the application layers include an RTP (real-time transport protocol) layer 74, an extended, UDP-Lite (user datagram protocol-Lite) layer 76, an IP (Internet Protocol) layer 77. The packet-formatting layers are positioned upon physical layers, here radio layers 78, to provide transmit and receive functionality to the respective devices 12 and 14.

The lines 36/45 are again shown in the Figure and representative of data, or indicia associated therewith, provided to the packet-formatting layers 74 and 76. And, the line 58 is also again shown in the Figure. The line 58 is again representative of application of indicia associated with the communication conditions upon communication channels defined upon the radio link 52 extending between the mobile station and the base transceiver station.

During operation of the formatting layers 74 and 76, digitized data that is to be communicated by, for example, the mobile station to the base transceiver station is packet-formatted, identified with an RTP data stamp, and UDP-formatted according to the extended UDP-Lite formatting protocol of an embodiment of the present invention.

FIG. 3 illustrates an exemplary data packet 48 formed pursuant to operation of an embodiment of the present invention. The data packet includes a header part 84 and a payload part 86. The header part of the data packet includes header information, and the payload part includes payload information, i.e., the informational content of the digital data includes an IP header 88 formed by the IP header layer 77 (shown in FIG. 3) followed by extended UDP-Lite-header 92 formed by the extended UDP-Lite layer 76, and an RTP header 94 formed by the RTP layer 74.

The payload part 86, for purposes of example, includes a first part 96, a second part 98, and a third part 102. The first part 96 forms a media (sensitive) data part formed of IP, UDP, and/or RTP octets. And, exemplary, lower-priority, here designated media priority 2 and media priority 3 data octets form the parts 98 and 102, respectively.

Information contained in the extended UDP-Lite-header part 92 includes three sub-fields associated with each of the parts 96, 98, and 102. Namely, the portion 92 includes length sub-fields 104, checksum sub-fields 106, and checksum value sub-fields 108 associated with each of the parts 96, 98, and 102. For a payload part, the length sub-field is populated with values indicating the length of such payload part, the checksum field sub-frame indicates the type of checksum by which the designated part is protected, and the checksum sub-frame 108 designates the checksum value of the checksum that protects the designated part. The values populated in the checksum sub-field indicate, for instance, a value stored at a look-up table, accessible at both the sending station and the receiving station, to be accessed and used, otherwise in conventional manner, to calculate a checksum value to ensure appropriate communication of the data packet upon a communication channel to be received at a receiving station. The checksum sub-field further includes a single-bit flag, or other identifier, here designated at 112, representative of whether an additional part of the data packet is protected by additional checksums. Here, the first two checksum sub-fields include the flags 112 set with logical one values, while the final checksum sub-field populates the flag with a logical zero value.

Referring back again to FIG. 1, the base transceiver station is also shown to include apparatus 38 of an embodiment of the present invention. The base transceiver station also includes transmit and receive parts, designated at elements 128 and 132, respectively. The apparatus includes an extractor 134 coupled to the receive part 128 to extract, from received data packets, the information contained in the header field 92. And, responsive to the extracted information, a checksum calculator 136 operates to perform checksum calculations upon the separate parts of the data packet. Thereby, the integrity of the parts of the data packet are verified. If the parts are determined to be corrupted, the data packet can selectably be caused to be resent.

FIG. 4 illustrates an exemplary header field formed of the header part 84 of an exemplary data packet 48 (shown in FIG. 3). The sub-fields 104, 106, and 108, here identifying N parts of the data packet that are covered by checksums, form parts of the header portion 84. And, the header portion here further is shown to include two-byte sub-fields 138 and 140 that identify source and destination port numbers, conventional of UDP formatting.

As the comments associated with the respective sub-fields indicate, in the exemplary implementation, the sub-fields 108 that are populated with checksum values are values that are determined from checksum-type tables, and the sub-fields 104 are of selectable one or two byte-lengths, the lengths of which are identified by the value of the most significant bit thereof.

Figure 5:
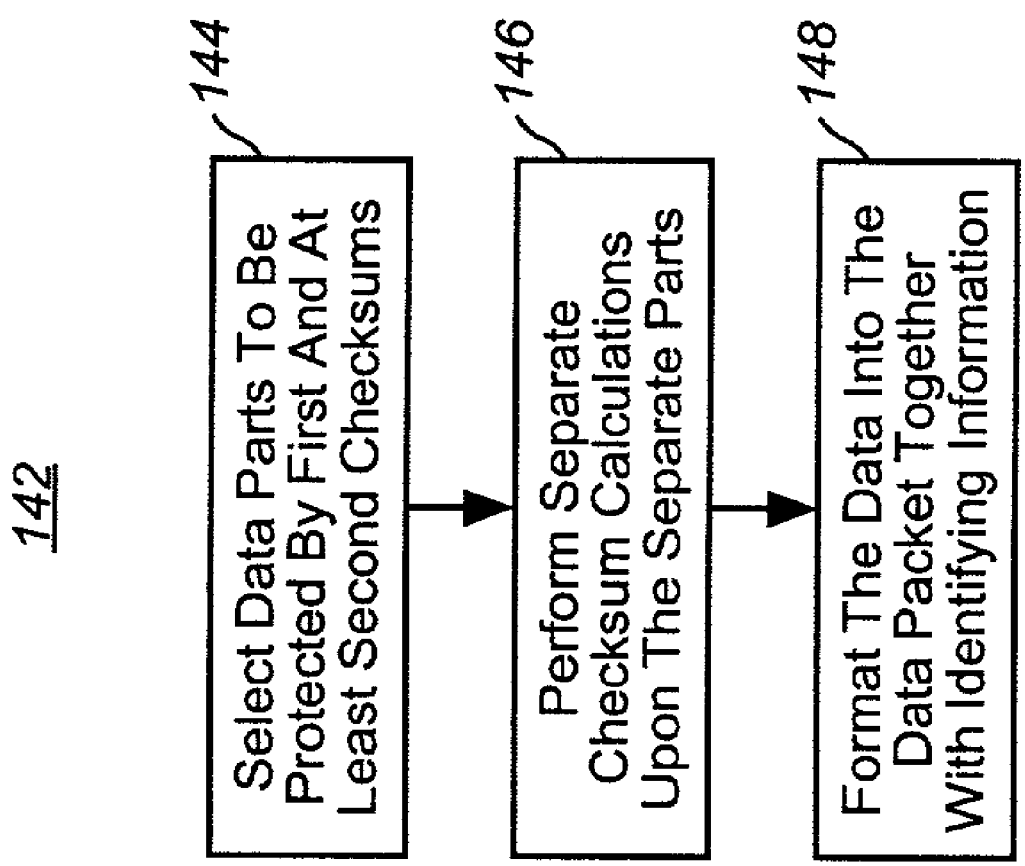
FIG. 5 illustrates a method flow diagram listing the method of operation of an embodiment of the present invention.

FIG. 5 illustrates a method flow diagram, shown generally at 142, representative of the method of operation of an embodiment of the present invention. The method selectably protects a first selected portion of a data packet by a first selected checksum and at least a second selected portion of the data packet by a second selected checksum.

First, and as indicated by the block 144, a first part of the data used to form the packet-formatted data packet is selected to form the packet-formatted data packet to form the first selected portion to be protected by a first checksum and at least a second part of the data to form the at least the second selected portion. Then, and as indicated by the block 146, a first checksum calculation is performed upon the first part and at least a second checksum calculation is performed on the at least the second part.

And, as indicated by the block 148, the data is formatted into a packet-formatted data packet. The packet-formatted data packet includes a first portion identified by the first selected portion and indicia associated with the first selected checksum. And, the data packet is formatted to include at least a second portion identifying the second selected portion and indicia associated with the at least the second selected checksum.

Thereby, a manner is provided by which to provide a data packet having multiple, dynamically-selected checksum-protected parts. Multiple, contiguous parts of the data packet are checksum-protected with selectable checksum-types.

The previous descriptions are of preferred examples for implementing the invention, and the scope of the invention should not necessarily be limited by this description. The scope of the present invention is defined by the following claims:

The invention claimed is:

1. In a packet communication system having a first communication station for sending data formatted into a packet-formatted data packet pursuant to a selected packet formatting protocol upon a communication channel, the packet-formatted data packet having a header part and a payload part, an improvement of apparatus for selectably protecting a first selected portion of the checksum-data packet by a first selected checksum at least a second selected portion of the data packet by a second selected checksum, said apparatus comprising:

a formatter coupled to receive the data to be sent by the sending station, said formatter for formatting the data pursuant to the selected packet data protocol to form the packet-formatted data packet therefrom, the data packet selectably having a first portion identifying the first selected portion and indicia associated with the first selected checksum and selectably having at least a second portion identifying at least the second selected portion and indicia associated with the at least the second selected checksum; and a selector coupled to said formatter, said selector selectably for selecting the first portion and the first selected checksum and selectably for selecting the second portion and the at least the second checksum.

2. The apparatus of claim 1 wherein said selector is coupled to receive indications of communication conditions of the communication channel, and wherein selections selectably made by said selector are responsive, at least in part, to values of the indications of the communication conditions.

3. The apparatus of claim 2 wherein the packet communication system further has a second communication station that communicates with the first communication station and wherein the indications of the communication conditions to which said selector is coupled to receive are representative of indicia associated with communications of the second communication station, once communicated on the communication channel.

4. The apparatus of claim 2 wherein the first communication station is defined in terms of logical layers, wherein the indications of the communication conditions are formed at a first logical layer and wherein said selector and said formatter are embodied at a second logical layer, defined above the first logical layer.

5. The apparatus of claim 4 wherein the selected packet formatting protocol comprises an extended UDP-Lite (User Datagram Protocol-Lite) protocol, wherein the first logical layer comprises a physical layer and wherein the second logical layer comprises an extended UDP-Lite layer.

6. The apparatus of claim 1 wherein the first portion selectably forming part of the packet-formatted data packet comprises a first-length field, the first length field identifying, at least by length, which portion is protected by the first checksum.

7. The apparatus of claim 6 wherein the first portion selectably forming part of the packet-formatted data packet comprises a first checksum-type field identifying, at least by type, a first checksum by which the first selected portion of the packet-formatted data packet is protected.

8. The apparatus of claim 7 wherein the first portion selectably forming part of the packet-formatted data packet comprises a first checksum-value field identifying, by value, the first checksum.

9. The apparatus of claim 1 wherein, when the second selected portion of the data packet is protected by the second checksum, the first portion of the data packet further comprises an indication field identifying presence of the second selected portion protected by the second selected checksum.

10. The apparatus of claim 1 wherein the second selected portion selectably forming part of the packet-formatted data packet comprises a second-length field, the second-length field identifying, at least by length, which portion is protected by the second checksum.

11. The apparatus of claim 10 wherein the second selected portion selectably forming part of the packet-formatted data packet comprises a second checksum-type field identifying, at least by type, a second checksum by which the second selected portion of the packet-formatted data packet is protected.

12. The apparatus of claim 11 wherein the second selected portion selectably forming part of the packet-formatted data packet comprises a second checksum-value field identifying, by value, the second checksum.

13. In the packet communication system of claim 1 wherein the packet-formatted data packet is sent upon a communication channel to a second communication station, a further improvement of apparatus for the second communication station for operating upon the dta packet, once received threat, said apparatus comprising:

a checksum extractor coupled to receive indications of values of the data packet, said checksum extractor for extracting values of the first portion and values of the at least the second portion selectably forming portions of the data packet.

14. The apparatus of claim 13 further comprising a checksum calculator coupled to said checksum extractor and to receive the indications of values of the data packet, said checksum calculator selectably for performing checksum calculations upon the first and at lest the second selected portions of the data packet.

15. The apparatus of claim 14 wherein said checksum calculator selectably performs checksum calculations upon the first selected portion of the data packet utilizing the first selected checksum and selectably performs checksum calculations upon the second selected portion of the data packet utilizing the second selected checksum.

16. In a method of communicating in a packet communication system having a first communication station for sending data formatted into a packet-formatted data packet pursuant to a selected packet formatting protocol upon a communication channel, the packet-formatted data packet having a header part and a payload part, an improvement of a method for selectably protecting a first selected portion of the data packet by a first selected checksum and at least a second selected portion of the data packet by a second selected checksum, said method comprising:

selecting a first part of the data used to form the packet-formatted data packet to form the first selected portion to be protected by a first checksum and at least a second part of the data used to form the packet-formatted data packet to form the at least the second selected portion;

performing a first checksum calculation upon the first part and at least a second checksum calculation upon the at least the second part; and formatting the data into a packet-formatted data packet to include a first portion identifying the first selected portion and indicia associated with the first selected checksum and at least a second portion identifying the second selected portion and indicia associated with the at least the second selected checksum.

17. The method of claim 16 further comprising the operations of:

sending the packet-formatted data packet to a second communication station;

extracting values contained in the first portion and in the at least second portion of the packet-formatted data packet; and selectably performing checksum calculations upon the first portion and the second portion responsive to values extracted during said operation of extracting.

18. The method of claim 16 wherein selections made during said operation of selecting are made responsive, at least in part, upon communication conditions, upon the communication channel.

19. The method of claim 18 further comprising the operation of determining the communication conditions upon the communication channel.

20. The method of claim 16 wherein selections made during said operation of selecting are made responsive to a content-type of the data to be sent by the first communication station.

* * * * *